Figure 1:
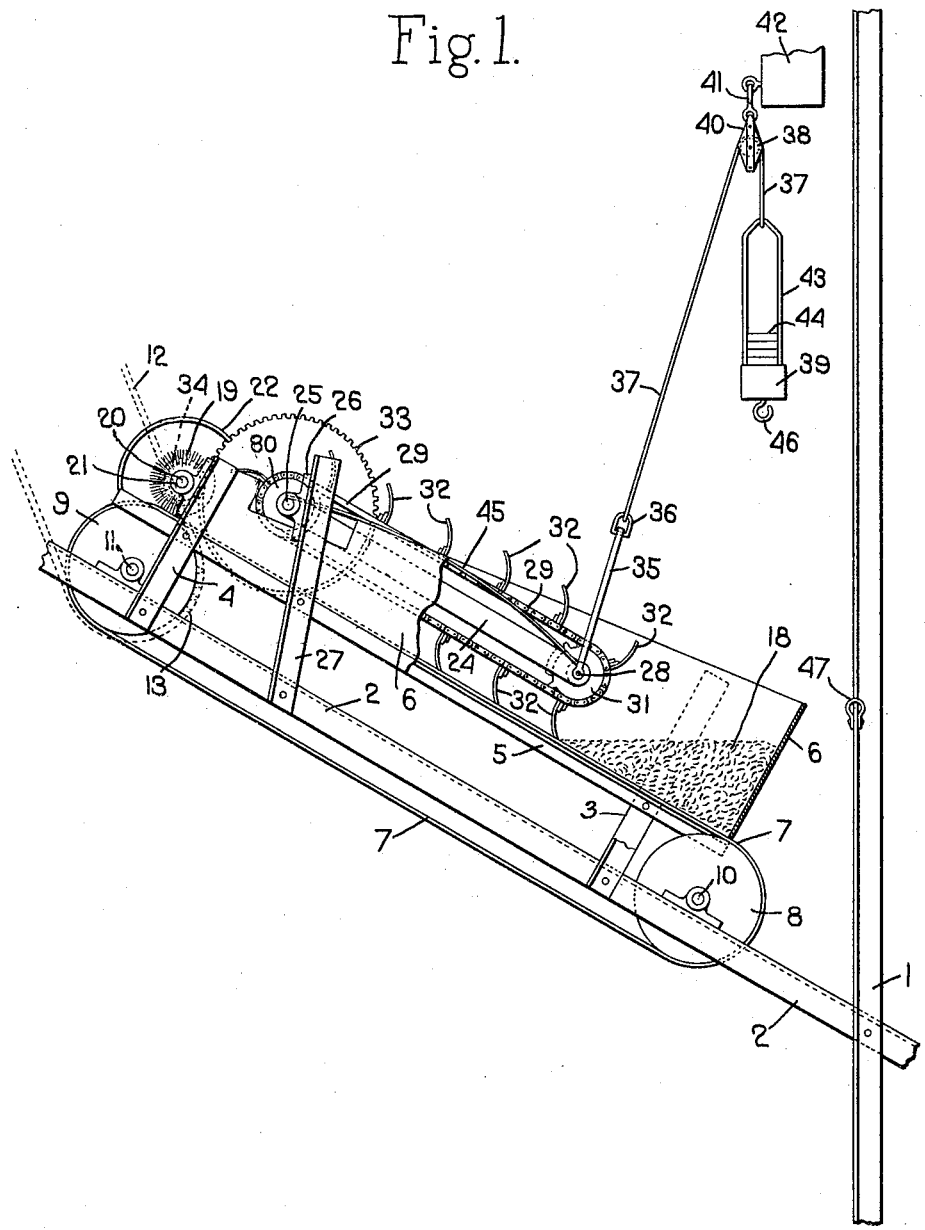

April 25, 1933.　　　　F. G. PURINTON　　　　1,905,056
MECHANISM FOR DISTRIBUTING ARTICLES UPON A TRAVELING ASSEMBLING CARRIER
Filed Dec. 3, 1930　　　　2 Sheets-Sheet 1

Inventor.
Forrest G. Purinton
by Heard Smith & Tennant.
Attys.

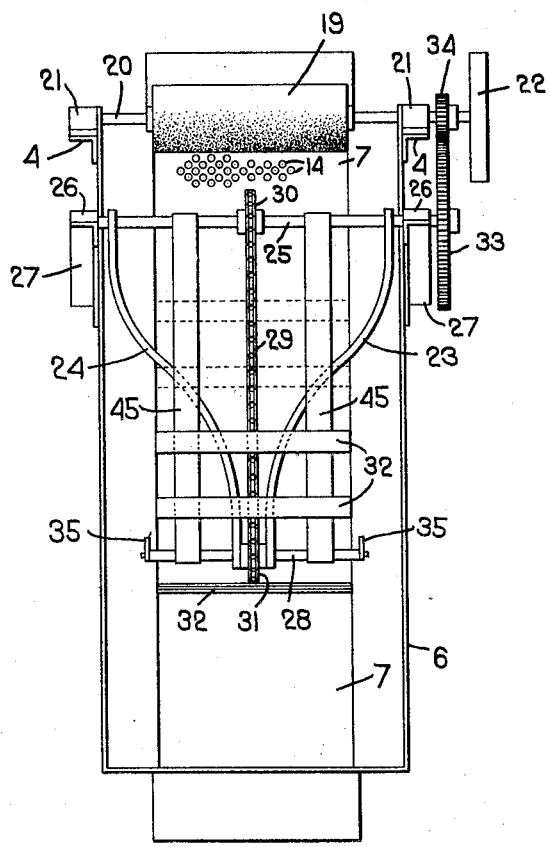
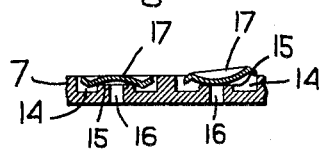

Patented Apr. 25, 1933

1,905,056

UNITED STATES PATENT OFFICE

FORREST G. PURINTON, OF WATERBURY, CONNECTICUT, ASSIGNOR TO THE PATENT BUTTON COMPANY, OF WATERBURY, CONNECTICUT, A CORPORATION OF CONNECTICUT

MECHANISM FOR DISTRIBUTING ARTICLES UPON A TRAVELING ASSEMBLING CARRIER

Application filed December 2, 1930. Serial No. 499,717.

This invention relates to improvements in machines for assembling a multiplicity of articles in narrowly spaced relation and preferably in like positions upon a traveling carrier.

More specifically the invention comprises certain improvements in machines of the type disclosed in my prior applications Serial Number 153,512, filed December 9, 1926, for Machines for assembling and coating a multiplicity of articles, and Serial Number 230,654, filed November 2, 1927, for Article-assembling and conveying machines.

Machines of this type comprise a hopper, the bottom of which consists, in whole or in part, of a traveling endless carrier having means to engage and assemble upon the carrier articles taken from a mass of such articles deposited in the hopper and resting upon the carrier.

As disclosed in such applications the means for engaging the articles comprise recesses adapted to receive only such articles as are presented to the recesses in a predetermined position, so that the articles contained in such recesses are presented with like faces uppermost. In the operation of such machines frequently not all of the recesses of the traveling carrier are filled.

The principal object of the present invention is to provide mechanism for spreading articles, from the mass of articles within the hopper, upon the traveling carrier in such a manner as more completely to fill all of the recesses in the carrier, or if other article-engaging means are provided to insure engagement of the articles with all or substantially all of such article-engaging means.

This is accomplished in the present invention by providing spreading means operable to engage the mass of articles in the carrier and to spread the articles so engaged over the traveling carrier in such a manner as to insure proper positioning of the articles upon all or substantially all of the article-engaging means.

A further object of the invention is to provide yieldable means for supporting the spreading means which will permit the spreading means to accommodate itself to the varying depth of the mass of articles in the hopper as said mass is depleted by the action of the traveling carrier.

A further object of the invention is to provide means for brushing back improperly positioned articles into the field of operation of the spreading means, thereby further insuring proper positioning of said articles upon substantially all of the article-engaging means.

These and other objects and features of the invention will more fully appear from the following description and the accompanying drawings and will be particularly pointed out in the claims.

In the drawings:

Fig. 1 is a view, mainly in side elevation and partially in vertical section, of a sufficient portion of an article-assembling means to show the application of the present invention thereto;

Fig. 2 is a plan view of the mechanism illustrated in Fig. 1, the means for yieldably supporting the spreader being omitted; and, Fig. 3 is an enlarged detail view, in vertical section, of a preferred form of assembling carrier illustrating an article, such as a button, properly positioned in one of the recesses of the carrier, and another article or button improperly positioned in such recess and adapted to be discharged therefrom.

The present invention is illustrated herein as applied to an assembling machine of the type disclosed in my prior applications particularly designed for assembling buttons in closely spaced juxtaposition upon a traveling carrier, but it will be understood that the invention may be applied to other types of traveling carriers, and that the traveling carrier may be provided with other types of mechanism for engaging and removing articles in assembled relation from a mass of articles deposited in the hopper.

The machine illustrated in the drawings comprises uprights 1, one of which is illustrated, upon which is mounted a frame comprising side members 2 having pairs of standards 3 and 4 rising therefrom, and connecting girders 5 supporting a hopper 6. The traveling carrier, which is illustrated, comprises an endless conveyer 7, the upper lead of which forms the bottom of the carrier. The endless conveyer is mounted upon suitable rollers 8 and 9, the shafts 10 and 11 of which are journalled in suitable bearings mounted upon the side members 2 of the supporting frame.

Any suitable means may be provided for driving the endless carrier 7. As illustrated herein, the endless carrier is actuated by a sprocket chain or belt 12 driven from any suitable source of power, which engages a sprocket wheel or pulley 13 fixedly secured to the shaft 11.

The assembling carrier 7, in the preferred form illustrated herein, comprises an endless belt, of heavy leather or other suitable material, the upper or grain surface of which is provided with closely juxtaposed, narrowly separated, recesses (see Fig. 3), which are provided with countersunk annular portions 14 leaving an upwardly extending central portion 15 which desirably is provided with a central aperture 16 to prevent the articles, such as buttons 17, deposited in the recesses, from being held therein by suction, and which may also be employed as in the constructions disclosed in my prior application Serial Number 230,654 to permit the utilization of a blast of air for dislodging the articles therefrom.

In the operation of the machine a mass 18 of buttons, or other articles, is deposited in the hopper which is supported in an inclined position so that the mass of articles rests upon the upper lead of the traveling carrier at the lower portion of the hopper. As the upper lead of the traveling carrier moves lengthwise, to the left, as illustrated in Fig. 1, such articles as are presented with the concave faces downward will enter and be wholly enclosed within the recesses, while any articles, as are presented with the convex faces down, will not fit within the recesses and will be discharged therefrom during the upward movement of the carrier, or may be dislodged from the recesses by a suitable brush.

In the construction illustrated herein the means for thus discharging improperly positioned articles from the recesses comprises a brush 19 having a shaft 20 which is mounted in suitable brackets 21 in the standards 4 of the hopper frame adjacent the discharge end of the hopper. The shaft 20 is driven in any suitable manner as by a pulley 22 actuated by a suitable belt (not shown).

The mechanism above described may be and is similar to that disclosed in my prior applications aforesaid.

The mechanism for insuring proper filling of the recesses of the traveling carrier comprises a spreader having means to engage and gradually drag articles from the mass of articles and means for actuating the spreader in such a manner as to cause it to sweep and distribute the articles dragged from the mass over the assembling carrier in such manner as to fill substantially all the recesses therein. In the preferred construction illustrated herein the spreader mechanism comprises a frame consisting of reversely curved members 23 and 24, which are pivotally mounted at one end upon a shaft 25 which is journaled in suitable bearings 26 in standards 27 which are mounted upon the side members 2 and girders 5 of the hopper-supporting frame. The pivotally supported ends of the frame members 23 and 24, are widely separated, being located respectively in proximity to the sides of the hopper 6 while the opposite ends of the members 23 and 24 are narrowly spaced apart and mounted upon or connected to a shaft 28.

An endless member, such as a sprocket chain 29, is mounted upon a sprocket wheel 30 which is secured to the central portion of the shaft 25 and upon a complementary sprocket wheel 31 which is rotatably mounted upon the shaft 28.

A series of preferably curved spreader blades 32, of rubber or other suitable somewhat flexible material, are secured centrally to the sprocket chain 29 at suitably spaced intervals and extend outwardly therefrom.

Any suitable means may be provided for actuating the sprocket chain 29. As illustrated herein, the shaft 25, to which the sprocket gear 30 is secured, is provided at one end with a gear 33 which is driven by a pinion 34 upon the shaft 20 of the brush 14.

Preferably the free end of the spreader frame is yieldably supported to permit the spreader to accommodate itself to the depth of the mass of articles in the hopper.

In the preferred construction illustrated a yoke 35 is pivotally connected at its ends to the shaft 28 at the end of the spreader frame and is provided at its central portion with a slide 36 which is connected to a cable 37 running over a pulley 38 and connected at its opposite end to a suitable counterweight 39. The pulley 38 is mounted in a suitable pulley block 40 which is connected by a link 41 to a rigid support 42 upon the main frame.

In order to enable the weight interposed by the counterweight upon the cable 37 to be adjusted, the counterweight desirably comprises a cage having a heavy base with an inverted U-shaped bar 43 rigidly secured thereto, the loop of the U-shaped bar being connected to the cable 37. By reason of this construction additional weights 44, having oppositely disposed notches to engage the legs of the U-shaped bar 42, may be removably superimposed upon the base of the counterweight 39. By increasing or decreasing the number of weights 44, the effective weight of the counterweight may be readily varied.

The shaft 25 of the spreader is located at such distance above the upper lead of the assembling carrier 7 that the spreader blades 32, carried upon the lower lead of the sprocket chain 29, will engage the upper lead of the assembling carrier throughout a whole or a portion of the length of the spreader frame. By yieldably supporting the free end of the spreader frame, however, the spreader blades will be permitted to engage the surface of the mass of articles in the hopper when the hopper is sufficiently filled and distribute the articles therefrom over the assembling carrier. The spreader will also serve to displace such articles as are improperly positioned upon the assembling carrier and move them upwardly and laterally sufficiently to present them to unfilled recesses in the carrier, thereby insuring a more complete filling of all the recesses in the carrier.

Inasmuch as the carrier blades are connected to the sprocket chain only at their central portions, guide plates 45 desirably are mounted upon the shafts 25 and 28 at considerable distances from the chains 29 and serve to support the blades while moving along the upper lead of the sprocket chain. The central connection only of the spreaders to the sprocket chain permits slight vibration of the spreader blades as they pass along the upper lead of the assembling carrier which more effectively distributes the articles upon the carrier.

It will be noted that in the construction illustrated the hopper 6 is of greater width than the carrier so that articles, which pass beyond the ends of the spreader blades, are deposited upon the bottom of the hopper and slide by gravity back into the mass of articles at the lower end of the hopper. In order to facilitate the filling of the hopper, means are provided for swinging the free end of the spreader upwardly to give ample space for dumping articles into the hopper. In the present invention this is accomplished by providing the base of the counterweight 39 with a hook 46 adapted, when the counterweight is pulled down, to be engaged by a loop or eye 47 mounted upon the standard 1 of the frame.

In the operation of the device, therefore, the spreader blades are caused to move over the assembling carrier and a portion of the mass of articles in the hopper in the same direction as the direction of movement of the assembling carrier, but at a relatively greater speed, thereby distributing the articles over the entire width of the endless carrier and practically insuring the filling of all the recesses of the assembling carrier. The spreader also serves to dislodge articles which are improperly positioned in the recesses in the carrier and to turn them over and deposit them in unfilled recesses. Such articles as are not deposited properly in the recesses of the assembling carrier are thrown back by the brush 19 into the field of operation of the spreader, thereby further insuring their proper distribution by the spreader and the more complete filling of the recesses in the assembling carrier.

It will be understood that the particular embodiment of the invention disclosed herein is of an illustrative character; that other forms of assembling carrier may be employed; and that various changes in form, construction, and arrangement of parts may be made within the spirit and scope of the following claims.

Having thus described the invention, what is claimed as new, and desired to be secured by Letters Patent, is:

1. A machine for assembling small articles in predetermined closely arranged juxtaposition comprising an inclined hopper having a bottom, side walls and a transverse wall at its lower end to receive a compact mass of said small articles, said bottom comprising a traveling assembling carrier provided with means to engage and remove from the mass of articles in said hopper only such articles as are presented thereto in a predetermined position, a traveling spreader having yieldable means to engage the mass of articles, means for actuating said spreader to cause it gradually to drag the articles from the mass and sweep and distribute the same over said assembling carrier, and means for yieldably supporting said spreader to permit it to accommodate itself to the varying depth of the mass of articles in the hopper.

2. A machine for assembling small articles in predetermined closely arranged juxtaposition comprising an inclined hopper having a bottom, side walls and a transverse wall at its lower end to receive a compact mass of said small articles, said bottom comprising a traveling assembling carrier having closely juxtaposed recesses each presenting a contour substantially complementary to one of the faces of said articles and operable to receive and remove from the mass of articles in the hopper only such articles as wholly enter said recesses, a travelling spreader having yieldable means to engage the mass of articles and also the recessed face of said assembling carrier, and means for actuating said spreader to cause it gradually to drag the articles from the mass and sweep and distribute the same over said assembling carrier.

3. A machine for assembling small articles having opposite faces of different contour in predetermined closely arranged juxtaposition comprising an inclined hopper having a bottom, side walls and a transverse wall at its lower end to receive a compact mass of said small articles, said bottom comprising a traveling assembling carrier having closely juxtaposed recesses each presenting a contour substantially complementary to one of the faces of said articles and operable to receive and remove from the mass of articles in the hopper only such articles as wholly enter said recesses, a spreader comprising a traveling endless member mounted above and in substantial parallelism with said assembling carrier and provided with means to engage the mass of articles in said hopper, and means for actuating said spreader to cause the article-engaging means thereof to sweep along the traveling assembling carrier in the same direction but at a relatively greater speed.

4. A machine for assembling small articles having opposite faces of different contour in predetermined closely arranged juxtaposition comprising an inclined hopper having a bottom, side walls and a transverse wall at its lower end to receive a compact mass of said small articles, said bottom comprising a traveling assembling carrier having closely juxtaposed recesses each presenting a contour substantially complementary to one of the faces of said articles and operable to receive and remove from the mass of articles in the hopper only such articles as wholly enter said recesses, a spreader comprising a traveling endless member mounted above and in substantial parallelism with said assembling carrier and provided with flexible curved spreading blades to engage the mass of articles in said hopper, means for actuating said spreader to cause the article-engaging means thereof to sweep along the traveling assembling carrier in the same direction but at a relatively greater speed, and means for yieldably supporting said spreader to permit it to accommodate itself to the varying depth of the mass of articles in the hopper.

5. A machine for assembling small articles in predetermined closely arranged juxtaposition comprising an inclined hopper having a bottom, side walls and a transverse wall at its lower end to receive a compact mass of said small articles, said bottom comprising the upper lead of a traveling endless assembling carrier provided with means to engage and remove from a mass of articles in said hopper only such as are presented thereto in a predetermined position, a spreader comprising a frame pivotally mounted at one end within said hopper adjacent the discharge end thereof above and normally extending in substantial parallelism with said assembling carrier, a flexible endless member mounted upon said frame having flexible blades extending transversely of said carrier to engage said assembling carrier and also the mass of articles in said hopper, and means for actuating said flexible endless member to cause the article-engaging means thereof to sweep along and distribute articles from the mass over the assembling carrier.

6. A machine for assembling small articles in predetermined closely arranged juxtaposition comprising an inclined hopper having a bottom, side walls and a transverse wall at its lower end to receive a compact mass of said small articles, said bottom comprising the upper lead of a traveling endless assembling carrier provided with means to engage and remove individually from a mass of articles in said hopper only such as are presented thereto in a predetermined position, a spreader comprising a frame pivotally mounted at one end within said hopper adjacent the discharge end thereof above and normally extending in substantial parallelism with said assembling carrier, a flexible endless member mounted upon said frame having flexible spreading blades to engage said assembling carrier and also the mass of articles in said hopper, means for actuating said flexible endless member to cause the spreading blades to sweep along said assembling carrier and distribute articles from the mass over the same, and means for yieldably supporting a portion of the weight of the free end of said frame to permit the spreading blades effectively to engage the surface of the mass of articles in the hopper.

7. A machine for assembling small articles in predetermined closely arranged juxtaposition comprising an inclined hopper having a bottom, side walls and a transverse wall at its lower end to receive a compact mass of said small articles, said bottom comprising the upper lead of a traveling endless assembling carrier provided with a multiplicity of closely adjacent recesses to engage and remove individually from a mass of articles in said hopper only such as are presented thereto in a predetermined position, a spreader comprising a frame pivotally mounted at one end within said hopper adjacent the discharge end thereof above and normally extending in substantial parallelism with said assembling carrier, a flexible endless member mounted upon said frame having spreading blades to engage said assembling carrier and also the mass of articles in said hopper, means for actuating said flexible endless member to cause the spreading blades to sweep along the assembling carrier and distribute articles from the mass over the same, a cable connected to the free end of the frame passing over a guide pulley located at a distance above said hopper, a counterweight upon the opposite end of said cable, and means for varying the weight of said counterweight.

8. A machine for assembling small articles in predetermined closely arranged juxtaposition comprising an inclined hopper having a bottom, side walls and a transverse wall at its lower end to receive a compact mass of said small articles, said bottom comprising the upper lead of a traveling endless assembling carrier provided with means to engage and remove from a mass of articles in said hopper only such as are presented thereto in a predetermined position, a spreader comprising a frame pivotally mounted at one end within said hopper adjacent the discharge end thereof above and normally extending in substantial parallelism with said assembling carrier, a flexible endless member mounted upon said frame having flexible spreading blades to engage said assembling carrier and also the mass of articles in said hopper, means for actuating said flexible endless member to cause the spreading blades to sweep along the endless carrier and distribute articles from the mass over the same, a cable connected to the free end of the frame passing over a guide pulley located at a distance above said hopper, a counterweight upon the opposite end of said cable, and means for securing said counterweight in a lowered position to retain the free end of the spreader above the hopper and thereby facilitate introduction of articles into the hopper.

In testimony whereof, I have signed my name to this specification.

FORREST G. PURINTON.